Feb. 26, 1952   B. H. BARNES ET AL   2,587,091
PISTON

Filed May 17, 1948   2 SHEETS—SHEET 1

INVENTORS
BYRON H. BARNES
BURT S. MINOR
BY
*Mason & Graham*
ATTORNEYS

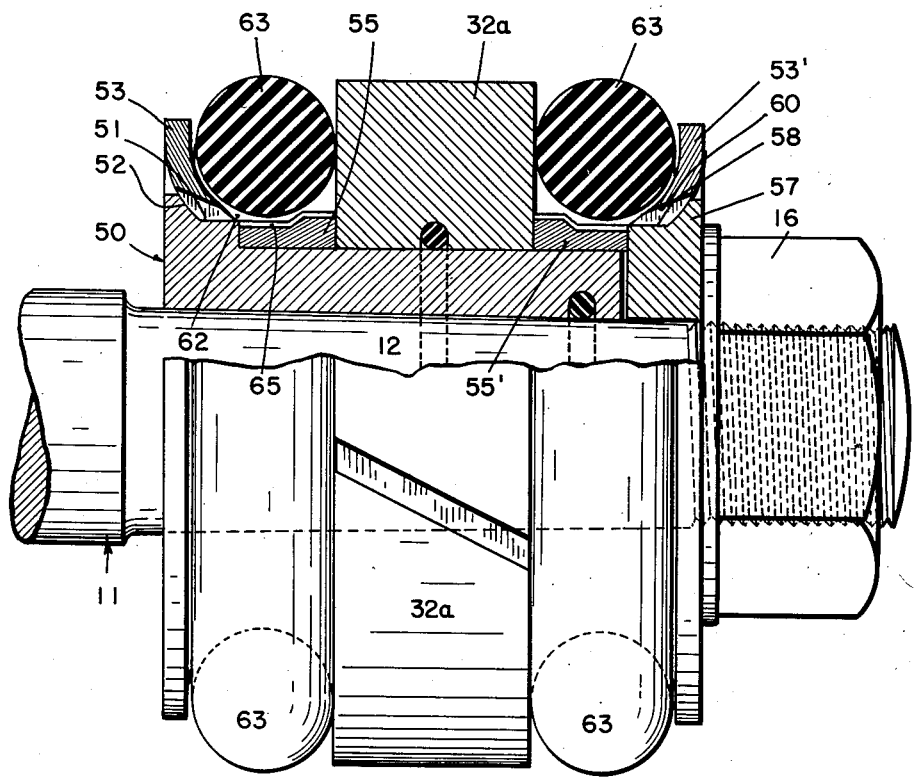

Patented Feb. 26, 1952

2,587,091

UNITED STATES PATENT OFFICE 2,587,091

PISTON

Byron H. Barnes, San Marino, and Burt S. Minor, Whittier, Calif.

Application May 17, 1948, Serial No. 27,444

2 Claims. (Cl. 309—23)

This invention relates generally to pistons and has to do particularly with pistons used in slush pumps such as are employed for pumping drilling fluid in rotary well drilling. The invention is an improvement upon the invention disclosed in our copending application for patent for Slush Pump Piston, Serial No. 762,108. In that application various disadvantages and objectionable features of pistons currently in use are described.

It is an object of this invention to provide an improved piston having the advantages of the piston set forth in our above referred to application over pistons presently in use and at the same time to provide a piston which has certain advantageous features and improvements over the piston disclosed in said application.

An object of the invention is to provide a piston construction embodying a pair of flexible packing rings and a central wear ring or bearing ring which may be readily dismantled and new parts installed without removing the piston rod from the pump cylinder.

Another object is to provide a piston having a new and improved type of wear or bearing ring for use between a pair of packing rings which is designed to center the piston and increase the life of the packing rings and which is constructed to permit the bypassing of fluid under pressure to opposite sides thereof.

A further object is to provide a piston having means for effecting and maintaining a seal between the piston proper and parts thereof and the piston rod on which it is mounted.

These and other objects will be apparent from the drawings and the following description. Referring to the drawings:

Fig. 3 is a fragmentary sectional view of a form of the invention in which packing members of circular cross section are used.

Figure 1:
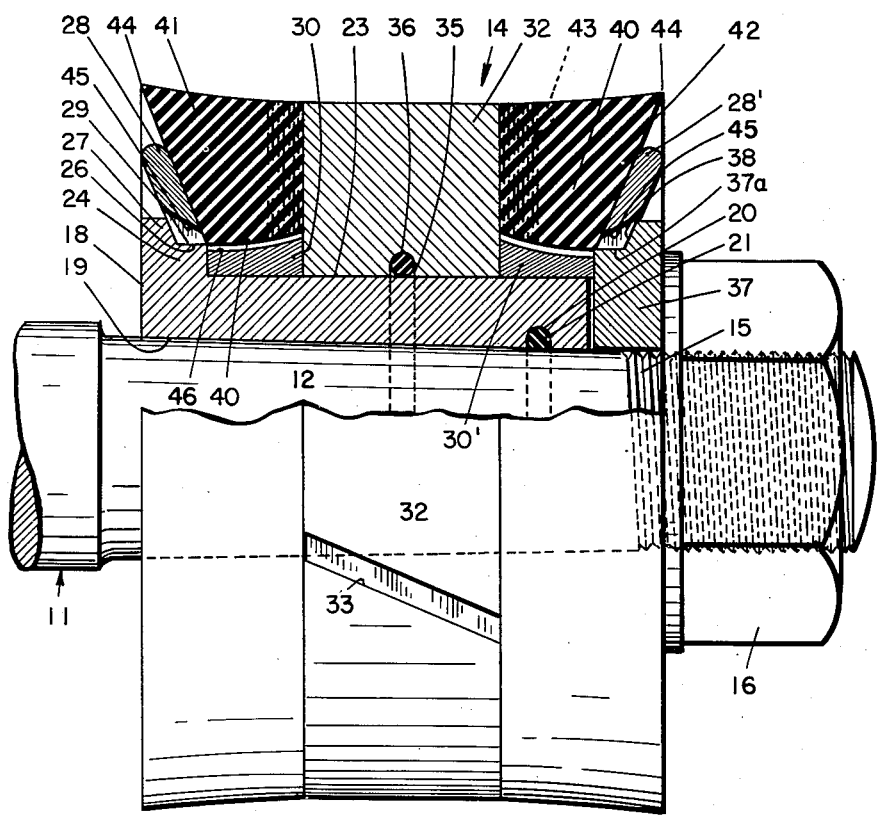
Fig. 1 is a sectional view of a piston embodying the invention shown mounted on a piston rod which is fragmentarily illustrated.

More particularly describing the invention, reference numeral 11 indicates a piston rod which is provided with a tapered seat 12 upon which the piston, generally indicated by numeral 14, is mounted. The outer end of the rod is threaded at 15 to accommodate a nut 16 which serves to secure the piston on the rod.

The piston itself comprises an inner sleeve or hub 18 which has a tapered bore 19 corresponding to the shape of the seat 12 on the piston rod. This hub is preferably made of steel and is provided with an internal packing groove 20 to accommodate a packing ring 21 which is preferably originally circular in cross section.

The hub is formed to provide a cylindrical outer surface 23 which terminates at its inner end in a radially projecting shoulder 24. Beyond the shoulder the hub has a peripheral recess defined by a cylindrical surface 26 and an inclined radially projecting shoulder 27. The recess receives a retainer ring 28 provided with a cylindrical inner surface 29 which seats on surface 26. The ring as a whole is inclined with respect to said surface 29 at the same angle as surface 27.

Seated against the shoulder 24 is an annular spacer sleeve 30 which serves to give axial support to a central wear or bearing ring 32. The bearing ring is preferably made of a suitable non-abrasive metal or material which is softer than the cylinder in which the piston is to work. For example an aluminum alloy bearing ring is suitable. The ring is preferably substantially rectangular in cross section, the outer diameter of the ring being only slightly less than the inner diameter of the cylinder or liner of the cylinder in which the piston is to work. The outer surface of the ring is interrupted by one or more diagonally extending channels or grooves 33 which serve to relieve pressure to opposite sides of the ring for a purpose which will hereinafter become apparent. The inner surface of the bearing ring is provided with an annular packing groove 35 to receive a packing ring 36.

Outwardly of the bearing ring is another spacer ring, indicated by numeral 30', which corresponds to the spacer ring previously described. At the end of the hub and separate therefrom is a washer 37 which is provided with a peripheral recess defined by cylindrical surface 27a and inclined shoulder 38. The recess receives a retainer or end ring 28' which corresponds to the retainer ring 28 previously described. The nut 16 on the piston rod serves to secure the parts together, bearing against washer 36 which in turn bears against the outer spacer sleeve 30'.

The two retainer rings and the two spacer sleeves cooperate with the centrally disposed bearing ring to provide two annular grooves or channels 40 for the reception of packing rings 41 and 42.

Figure 2:
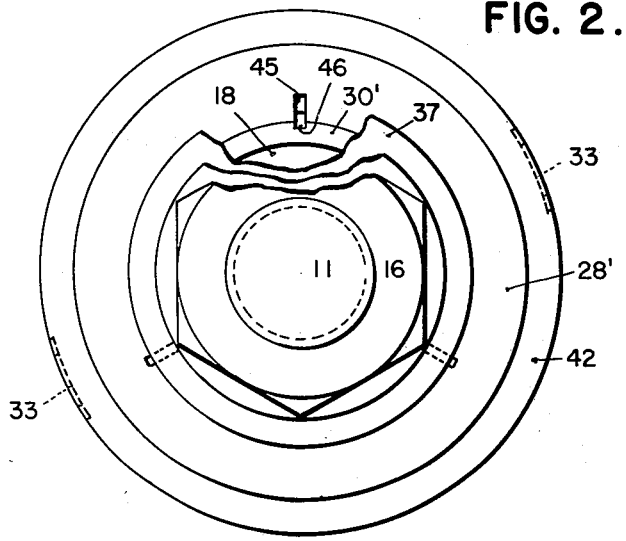
Fig. 2 is an end view of the piston of Fig. 1 with parts broken away.

In the form of the invention shown in Figs. 1 and 2 the packing rings each comprise a body of rubber, synthetic rubber or rubber-like material shaped to fit the grooves 40 and provided with an internal reinforcing means, such as fibres 43, in the region of the bearing ring. Each packing ring has a lip 44 which readily effects a seal with the cylinder wall when the piston is in a cylinder and pressure is brought to bear against it.

The piston is designed to have one packing ring function as the sealing member when the piston is moving in one direction and to have the other ring act as the sealing member when the piston moves in the opposite direction. In order to accomplish this it is necessary to relieve the pressure from the forward portion of the trailing piston since it has been found that the trailing packing, whether an O ring or a packing ring such as that disclosed in Fig. 1, does not permit escape of pressure past its periphery even when in trailing position. In this connection it has been found that while packing rings of the type shown in Fig. 1 are designed to relieve the pressure when in the trailing position, actually, after the piston has been in use for a short period of time the periphery of the packing rings at their inner ends tends to flare into engagement with the cylinder when in the trailing position and thereby prevent bypass of pressure past the periphery of the ring. Pressure relief is accomplished by providing passages through the retainer rings such as indicated at 45 and by providing grooves 46 across the outer surfaces of the spacer rings. It will thus be apparent that if the piston is traveling from left to right in Fig. 1, the packing ring at the right side of the piston will act as the sealing ring and any fluid pressure behind this ring may escape past the bearing ring 32 through the channels 33 therein and past the trailing packing ring by escaping down the forward side through the grooves 46 of the spacer ring passing under the packing ring to the passages 45.

It will be apparent that the construction described provides a piston in which a central bearing member is utilized for maintaining the piston as a whole centered within the cylinder as it reciprocates and that the packing rings function alternately as the piston reciprocates. It will also be apparent that the two inner packing rings 21 and 36 effectively prevent any escape of fluid pressure through the piston along the piston rod or along the outer surface of the hub. It further will be apparent that the piston may be readily disassembled and new parts installed merely by removing the nut 16 and progressively removing the parts of the piston.

In Fig. 3 there is shown a form of the invention in which so-called O-type packing rings, that is, packing rings of circular cross section, are employed. In this form of the invention the hub, indicated by 50, is provided with a peripheral recess 51 having a curved or arcuate surface 52 to receive a retainer ring 53 which is somewhat arcuate in cross section. Outwardly of this, the hub receives a spacer sleeve 55 which has a thickened section against which the bearing ring 32a bears. Beyond the bearing ring is another spacer sleeve 55' and beyond this a retaining washer 57 which is formed to provide a peripheral recess 58 similar to that formed in the hub at 51 to receive a retainer ring 53' which is similar to the ring 53 previously described. The retainer rings are provided with one or more fluid vent passages 60 therein.

The two retainer rings and the two spacer sleeves, together with the bearing ring, define a pair of packing grooves 62 in which are positioned the O-type packing rings 63. These rings preferably are of slightly greater external diameter than the internal diameter in which the piston is to work and preferably have an internal diameter such that there is clearance between the rings and the spacer rings 55, 55'. The spacer sleeves may be provided with one or more grooves 65 across their outer faces to insure pressure relief of the trailing packing, although these may not be necessary where the packing rings are not compressed against the spacer rings.

The piston shown in Fig. 3 operates in the same manner as the one previously described and may be disassembled and assembled in the same manner.

Although the invention has been particularly shown and described, it is contemplated that various changes and modifications may be made without departing from the scope thereof as indicated by the following claims.

We claim:

1. A piston construction comprising a piston rod, a sleeve-like hub removably mounted on said rod, a bearing ring removably mounted on said hub, said bearing ring having a pressure relief passage extending to opposite sides of the ring, means mounted on said hub cooperating with said bearing ring to form an external packing groove at one end of said hub, a washer mounted on said piston rod at the other end of said hub, means on said washer cooperating with said bearing ring to form a second external packing groove, a packing ring in each of said grooves, means providing a vent passage from the bottom of each of said packing grooves to the adjacent ends of the piston, and a member removably mounted on said piston adapted to bear against said washer and hold the parts of the piston together.

2. A piston comprising a piston rod provided with a seat and terminating beyond said seat in a screw threaded end, a sleeve-like hub having an interior surface corresponding to the seat on said rod, said hub having a major cylindrical outer surface terminating at its inner end in a radially projecting shoulder and having a peripheral recess beyond said shoulder, a centrally disposed bearing ring mounted on said hub, said bearing ring having a pressure relief passage to opposite sides thereof, a pair of spacer sleeves on said hub positioned one on each side of and in abutting relation to said bearing ring, said spacer sleeves having grooves extending across their outer faces, the innermost of said spacer sleeves abutting said radially projecting shoulder on said hub, a washer on said piston rod adjacent the outer end of said hub adapted to bear against the outermost spacer sleeve, said washer having a peripheral recess facing said bearing ring and corresponding to the peripheral recess in said hub, a retainer ring mounted in each of said peripheral recesses, said retainer rings and said bearing ring defining a pair of external packing grooves, said retainer rings being provided with vent passages in the region of the bottom of said grooves, a resilient packing ring in each of said external packing grooves, and a nut on the threaded end of said piston rod abutting said washer and serving to hold the elements of the piston together.

BYRON H. BARNES.
BURT S. MINOR.

REFERENCES CITED

The following references are of record in the file of this patent:

UNITED STATES PATENTS

| Number | Name | Date |
| --- | --- | --- |
| 1,844,236 | Armentrout | Feb. 9, 1932 |
| 2,267,882 | Wilson | Dec. 30, 1941 |
| 2,332,763 | Stewart | Oct. 26, 1943 |
| 2,429,426 | Phillips et al. | Oct. 21, 1947 |
| 2,450,693 | Sanders | Oct. 5, 1948 |